(12) United States Patent
Labordus et al.

(10) Patent No.: US 11,298,890 B2
(45) Date of Patent: Apr. 12, 2022

(54) METHOD AND DEVICE FOR JOINING MOULDED PARTS BY ELECTROMAGNETIC WELDING

(71) Applicant: KOK & VAN ENGELEN COMPOSITE STRUCTURES B.V., The Hague (NL)

(72) Inventors: Maarten Labordus, Delft (NL); Tom Johannes Jansen, Maassluis (NL); Michiel Hendrik Paul Bruijkers, Poortugaal (NL)

(73) Assignee: KOK & VAN ENGELEN COMPOSITE STRUCTURES B.V., The Hague (NL)

( * ) Notice: Subject to any disclaimer, the term of this patent is extended or adjusted under 35 U.S.C. 154(b) by 0 days.

(21) Appl. No.: 17/058,337

(22) PCT Filed: May 31, 2019

(86) PCT No.: PCT/NL2019/050317
§ 371 (c)(1),
(2) Date: Nov. 24, 2020

(87) PCT Pub. No.: WO2019/231327
PCT Pub. Date: Dec. 5, 2019

(65) Prior Publication Data
US 2021/0197497 A1 Jul. 1, 2021

(30) Foreign Application Priority Data
Jun. 1, 2018 (NL) .................................. 2021039

(51) Int. Cl.
*B29C 65/00* (2006.01)
*B29C 65/36* (2006.01)

(52) U.S. Cl.
CPC ...... *B29C 66/91655* (2013.01); *B29C 65/364* (2013.01); *B29C 66/7212* (2013.01);
(Continued)

(58) Field of Classification Search
CPC .............. B29C 65/364; B29C 66/7212; B29C 66/72141; B29C 66/73921; B29C 66/836;
(Continued)

(56) References Cited

U.S. PATENT DOCUMENTS 5,573,613 A   11/1996   Lunden
5,786,576 A * 7/1998   Lunden .................. B23K 13/02
                                                         219/633
(Continued)

FOREIGN PATENT DOCUMENTS

EP        2801472 A1    11/2014

OTHER PUBLICATIONS

International Search Report and Written Opinion for the International Patent Application No. PCT/NL2019/050317, dated Sep. 16, 2019, 12 pages.

*Primary Examiner* — George R Koch
(74) *Attorney, Agent, or Firm* — Kacvinsky Daisak Bluni PLLC (57) ABSTRACT

A method for joining moulded parts by electromagnetic welding. A joining inductor is moved along contact surfaces of the moulded parts, generating an electromagnetic field in an induction-sensitive component of the moulded part(s) to heat a thermally activated coupling means of the moulded part(s) to above a melting temperature of the coupling means. The strength of the electromagnetic field suitable for joining is determined by previously moving a sensing inductor along the contact plane, generating a relatively weak electromagnetic field to slightly heat the thermally activated coupling means to a sensing temperature, measuring the (Continued)

field strength generated by the sensing inductor in the moulded part(s), determining a discrepancy between the measured field strength of the sensing inductor and the field strength suitable for joining, and adjusting the field strength suitable for joining to close the discrepancy. A device for carrying out the method.

13 Claims, 6 Drawing Sheets

(52) U.S. Cl.
 CPC .. *B29C 66/72141* (2013.01); *B29C 66/73921* (2013.01); *B29C 66/836* (2013.01); *B29C 66/87441* (2013.01); *B29C 66/9192* (2013.01); *B29C 66/91221* (2013.01); *B29C 66/91311* (2013.01)

(58) Field of Classification Search
 CPC ........ B29C 66/87441; B29C 66/91221; B29C 66/91311; B29C 66/91315; B29C 66/91655; B29C 66/9192
 See application file for complete search history.

(56) References Cited

U.S. PATENT DOCUMENTS

| | | | |
|---|---|---|---|
| 2010/0206469 A1* | 8/2010 | Van Wijngaarden | ........................ B29C 66/8242 156/245 |
| 2014/0110054 A1 | 4/2014 | Shigihara et al. | |
| 2018/0007743 A1* | 1/2018 | Challita | .................. E04D 5/148 |

* cited by examiner

FIG. 5

METHOD AND DEVICE FOR JOINING MOULDED PARTS BY ELECTROMAGNETIC WELDING

This is a national stage application filed under 35 U.S.C. § 371 of pending international application PCT/NL2019/050317, filed May 31, 2019, which claims priority to Netherlands Patent Application No. 2021039, filed Jun. 1, 2018, the entirety of which applications are hereby incorporated by reference herein.

TECHNICAL FIELD OF THE INVENTION

The invention relates to a method for joining moulded parts by electromagnetic welding. The invention also relates to a device for electromagnetic welding that is configured for carrying out the method.

BACKGROUND OF THE INVENTION

A number of technologies exist for joining moulded parts, for instance fibre reinforced thermoplastic or thermosetting composite parts. Mechanical fastening and adhesive bonding are traditionally used to join two contact surfaces of the moulded parts. However, both mechanical fastening and adhesive bonding appear to be costly and time consuming. Mechanical fastening for instance requires expensive hole locating, drilling, shimming, and fastener installation, while adhesive bonding requires complicated surface pretreatments that may involve chemical substances.

Electromagnetic welding may eliminate the use of separate fasteners and potentially offers the ability to join contact surfaces of moulded composite parts at relatively high speeds and little, if any, pre-treatments. Electromagnetic welding generates an electromagnetic field in an induction-sensitive component of one or more of the moulded part(s) to heat a thermally activated coupling means of the moulded part(s) to above a melting temperature of the coupling means. The contact surfaces of the moulded parts are joined to each other by the molten coupling means. The coupling means may for instance be a thermoplastic resin of one or more of the parts to be joined, or may be a separately applied thermoplastic resin. For welding thermoplastic and thermoset moulded parts together, the thermoplastic resin that the induction-sensitive component melts may function as a hot melt adhesive for instance.

A number of welding methods are available for creating a welded connection between moulded parts such as fibre reinforced composite moulded parts. In vibration welding the reinforcing fibres may be damaged by the movement, and ultrasonic welding is less suitable for continuous welding for instance. Known methods of electromagnetic welding may produce joined products of inferior quality, particularly in high-grade applications in which relatively high mechanical strength and load-bearing capacity of the welded connection is desired, such as in the aviation industry.

Known methods in particular are based on determining the value of welding parameters, such as the strength of the electromagnetic field suitable for joining and the power needed to generate such field strength, and apply these welding parameter values for joining the moulded parts, or a series of such moulded parts. This approach relies on the belief that a constant welding quality is then realised. The notion of welding quality is known to a skilled person in the field and may for instance relate to the strength of the produced joint or connection between the contact surfaces of the moulded parts.

The known approach only works if the moulded composite parts show a consistent response to the imposed electromagnetic induction field. It turns out that this may not be the case for many moulded parts. It has for instance been found that moulded composite parts based on semi-crystalline polymers and reinforcing fibres such as carbon fibres show a relatively large variation in response to the imposed electromagnetic induction field. This variation may be caused by factors such as the reinforcing fibre architecture. This architecture in a composite part made of unidirectional fibre tapes offers less well-defined paths through which eddy currents can be generated than in, for example, a woven fabric architecture. This means that the response appears to be related to factors such as fibre volume content, fibre orientation, local distribution of resin and fibres, and consolidation quality, among others. Semi-crystalline polymers moreover may show a change in the melting point with degree of crystallinity changes. Depending on the temperature history of the moulded parts, the melting point may vary therefore. The reinforcing fibres also may vary in stiffness for instance, which also affects their electrical conduction properties. Applying steps in thickness locally, or using stiffeners for instance, may also affect the induction response across a moulded part. Moulding the parts before joining may also influence the electromagnetic induction response, for instance due to local variations in fibre volume content, or due to induced pre-stress in the reinforcing fibres.

The above noted variations in the moulded composite parts may lead to a response to the imposed electromagnetic induction field that is inconsistent along the contact surfaces to be joined. This directly influences the quality of the produced joint, and variation of the joint quality may be undesirable.

SUMMARY OF THE INVENTION

It is an object of the present invention to provide an improved method for joining moulded parts by electromagnetic welding, in particular a method that may produce a more consistent joint quality between the moulded parts. A further object relates to providing a device with which the method may be carried out.

The invention provides for this purpose a method for joining moulded parts by electromagnetic welding in accordance with claim 1. The method comprises moving a joining inductor along a contact surfaces of the moulded parts, generating an electromagnetic field in an induction-sensitive component of the moulded part(s) to heat a thermally activated coupling means of the moulded part(s) to above a melting temperature of the coupling means, and joining the moulded parts to each other in the contact surfaces by the molten coupling means, wherein the strength of the electromagnetic field suitable for joining is determined by previously moving a sensing inductor along the contact plane, generating a relatively weak electromagnetic field, the induced field strength in the moulded part(s) generated by the sensing inductor, determining a discrepancy between the measured field strength of the sensing inductor and the field strength suitable for joining, and adjusting the field strength suitable for joining to close the discrepancy.

The relatively weak electromagnetic field may slightly heat the thermally activated coupling means to a sensing temperature.

In an embodiment in which the thermally activated coupling means comprises a thermoplastic resin, the sensing temperature may be well below the glass transition temperature Tg and/or the recrystallization temperature of the resin.

The measured field strength of the sensing inductor allows predicting the most appropriate welding parameters suitable for joining the moulded parts, and assists in obtaining a consistent welded joint quality.

An embodiment of the invented method comprises determining the discrepancy continuously along the contact surfaces. The field strength suitable for joining may be kept constant along the weld, or may be adjusted locally where required. When the (value of the) discrepancy is zero or about zero in a position, the field strength in that position may not be adjusted at all or only slightly.

In an effective embodiment of the method according to the invention, adjusting the field strength suitable for joining—in order to minimize the discrepancy—is carried out continuously along the contact surfaces, and more preferably at the several positions of movement along the contact surfaces in which the value of the discrepancy was determined to be non-zero.

Another embodiment of the invention relates to a method wherein the sensing inductor is moved along the contact surfaces ahead of the joining inductor. In this embodiment, the sensing inductor and the joining inductor are separate inductors and the information obtained from the sensing inductor is used to control the joining inductor, in particular the strength of the electromagnetic field suitable for joining.

In another embodiment of the method according to the invention, the sensing inductor and the joining inductor are one and the same. In such an embodiment, an inductor is first used as sensing inductor for 'sensing' the contact surfaces to be joined of the moulded parts, whereto it is moved along a path within the contact surfaces. The same inductor is then used for actual welding as a joining inductor, whereby the field strength is adapted depending on the discrepancies determined by the sensing inductor.

Another embodiment of the invention relates to a method wherein the sensing inductor and the joining inductor are separate and are simultaneously moved along the contact surfaces. This embodiment allows adjusting the field strength suitable for joining instantaneously, by which is meant in direct response to the discrepancy measured by the sensing inductor.

The distance between the sensing and joining inductors along the welding path may be chosen according to the circumstances. In case the joining and sensing inductors are relatively close to each other, the electromagnetic fields generate by both inductors may influence each other. In a preferred embodiment, the influence of the joining inductor on the signal of the sensing inductor is corrected for by quantifying the effect with an unloaded base-line measurement, after which the off-set value obtained in the base-line measurement is deducted from the response measurement during actual joining welding. This allows quantifying the induction response at any position, after which the optimum welding settings can be determined via a predetermined relationship.

An embodiment of the invention provides a method wherein the sensing inductor comprises an emitting inductor generating the electromagnetic field and a receiving inductor measuring the field strength generated by the sensing inductor in the moulded part(s). The emitting inductor generates the relatively weak electromagnetic field, which will cause eddy currents to occur in the moulded parts. The receiving inductor on the other hand quantifies the eddy currents generated in the moulded parts. The emitting and receiving inductors may be housed separately or may be housed in one and the same housing. In case the emitting and receiving inductors are relatively close to each other, the electromagnetic field generated by the emitting inductor may influence the measurement of the receiving inductor. In a preferred embodiment, the influence of the emitting inductor on the signal received by the receiving inductor is corrected for by quantifying the effect with an unloaded base-line measurement, after which the off-set value obtained in the base-line measurement is deducted from the response measurement of the receiving emitter during sensing.

The invented method comprises quantifying the eddy current response in advance of the actual electromagnetic welding of the moulded parts to join them along contact surfaces by using relatively weak induction fields. With the help of this response it can be predicted what the correct welding parameters for any moulded (composite) part are to potentially obtain a good weld quality. The method is carried out by running a sensing inductor, such as a sensing coil prior to running the actual welding coil for joining, whereby the sensing coil quantifies the response.

The field strength generated by the sensing inductor may be measured directly or may be measured through another parameter. It is for instance possible to measure the temperature rise caused by the imposed electromagnetic field. The generated temperature may be determined directly in the weld and/or indirectly on the outside of the parts to be welded. This approach may need improvement since the generated temperature rise by definition lags behind changes in the welding parameters.

Another embodiment of the invented method comprises measuring the field strength generated by the sensing inductor in the moulded part(s) by measuring the electrical currents caused by a short circuit at edges of the moulded part(s). This so-called edge effect is known per se, and, during welding, the generated eddy currents would be directly quantifiable by measuring this edge effect. The edge-effect may be minimized by providing an electrically conductive material around or along the welding area, optionally in combination with susceptors, known per se.

Measuring the strength of the generated electromagnetic field in the form of eddy currents is carried out by the sensing inductor. Another embodiment however comprises further measuring the field strength generated by the joining inductor in the moulded part(s) and determining a discrepancy between the measured field strength of the joining inductor and the field strength suitable for joining. This embodiment allows for a quality control in that joined parts for which the discrepancy between the measured field strength of the joining inductor and the field strength suitable for joining is above a certain pre-determined threshold value are discarded, or allows for an in-line adjustment of the field strength to ensure the field strength suitable for joining is always guaranteed.

All measurements of generated field strengths preferably also apply to the power required to generate such field strengths.

Electromagnetic welding of moulded parts in accordance with the invention may comprise providing a mould, placing at least two moulded parts for coupling in the mould, wherein contact surfaces between the moulded parts comprise a thermally activated coupling means and an induction-sensitive component, activating the coupling means by heating the induction-sensitive component by means of an inductor, wherein the inductor may be situated outside the mould, and pressing the moulded parts together in the configuration defined by the mould, wherein the moulded parts are coupled by the thermally activated coupling means.

An inductor typically comprises an electrical conductor which, under alternating voltage, generates an electromagnetic field. The shape of the electromagnetic field may be any known shape, such as coiled, or substantially cylindrical in a direction of welding. The use of a substantially cylindrical electromagnetic field in the welding direction enables very controlled, uniform and targeted heating, so that overheating is prevented as far as possible. Overheating may result in degradation of material, and thereby cause undesirable weakening of the construction. Other inductors comprise a plurality of windings, which produces a torus-shaped electromagnetic field. By using such a known inductor with the direction at right angles to the inductor as direction of induction, a heating pattern is created in which a relatively cold zone occurs in the centre. The cylindrical electromagnetic field on the other hand produces a much more favourable heating profile which enables uniform heating. A cylindrical electromagnetic field can moreover be made very narrow, up to a width of 10-20 mm. In torus-shaped fields such a width cannot be realized in combination with the required heat-inducing power and penetration.

The electromagnetic field of the inductor may reach the contact surfaces between the moulded parts directly, through sections of the moulded part(s), and/or through a wall of the mould. The invented method makes it possible to realize a good-quality welded connection or joint between the moulded parts in a rapid and efficient manner, the obtained joined product having a particularly good mechanical load-bearing capacity.

One or more moulded parts are preferably manufactured from a thermoplastic material which can be welded by fusion, although it is also possible to envisage arranging a thermoplastic material or a thermally activated adhesive only on the contact surface between the moulded parts as thermal coupling means.

Induction-sensitive components generally comprise an electrically conductive component such as a metal and/or carbon fibre. The mould and other components in the vicinity of the inductor which do not have to be heated are preferably substantially free of induction-sensitive components or are shielded from the induction field with a suitable shielding material, wherein electrically insulating yet thermally conductive components such as ceramic material are recommended for extracting heat from the contact surface of the adjacent moulded part during the welding. In such a mould the electromagnetic field can then be applied at the desired position through the wall of the mould.

In the method the preferably thermoplastic moulded parts are generally provided with an electrically conductive component, for instance metal gauze, or this component is arranged between the moulded parts. Foucault currents or eddy currents are induced in the electrically conductive component by a fluctuating electromagnetic field which is generated by an inductor supplied with alternating current by a generator. Owing to several heating mechanisms like the Joule effect, fibre junction heating and dielectric hysteresis, these Foucault currents generate the heat required to melt the thermoplastic material and/or activate the coupling means. By moving the inductor along the contact surfaces the thermoplastic moulded parts are mutually connected over their contact surface. The inductor can be guided over the contact surface for instance by means of a robot arm or linear guide in order to realize the connection.

For the purpose of heating, the induction-sensitive component must be in thermal contact with the thermally activated coupling means. This is for instance possible by mixing the induction-sensitive component and the coupling means.

An embodiment wherein the joining inductor is situated outside the mould and the electromagnetic field of the inductor reaches the contact surface between the moulded parts through a wall of the mould, allows bringing the moulded parts together under pressure by the mould during the welding. Other embodiments may apply pressure after the inductive heating of the moulded parts for coupling has taken place.

Compressing the moulded parts can take place using means known from the prior art, such as pneumatic or hydraulic presses and rollers. The pressure is preferably applied on the mould on the non-inductor side of the mould, in other words on that side of the mould where the inductor is not situated. The wall of the mould is preferably provided with a recess at the position of the contact surface, in other words above the welding position. Such a recess makes it possible to move the inductor closer to the contact surface, whereby heating can take place with greater precision and whereby less power is also required. In order to make the pressure on the moulded parts for coupling as high as possible at the location of the welding position, it is advantageous to make the width of the recess as small as possible, and preferably such that it hardly exceeds the inductor width. In order to be able to obtain the highest possible pressure, the wall is manufactured at the position of the recess from a material with a high stiffness.

Depending on the materials used, in particular the induction-sensitive component and the distance of the inductor from this component, a suitable power and frequency can be determined, as results from the sensing inductor response. The frequency determines inter alia the penetrative power of the electromagnetic field; the electric power of the inductor determines the strength of the fluctuating electromagnetic field and thereby the degree of heat generated in the induction-sensitive component.

It is advantageous if the thermally activated coupling means comprises a thermoplastic plastic. Thermoplastic plastics can be coupled in simple manner by fusion. Furthermore, it is easy to mix a thermoplastic plastic with an induction-sensitive component such as metal gauze or carbon fibres. Examples of particularly suitable thermoplastic plastics are polypropylene, polyamide, polyetherimide, polyetherketoneketone, polyetheretherketone and polyphenylene sulfide, although the method is in principle suitable for any thermoplastic.

The component heatable by induction preferably comprises carbon fibres and/or a metal. These materials can be readily heated by induction and also have, in addition to electrical conduction, a good thermal conduction, whereby the generated heat is well distributed. Carbon fibres incorporated in a thermoplastic plastic are recommended because the carbon fibres also improve the material strength. In another preferred embodiment of the method the component heatable by induction comprises ferromagnetic or carbon nano particles.

In the method according to the invention it is possible for both the mould and the inductor to be stationary. This may for instance be appropriate for the coupling of a relatively small portion of the contact surfaces of the moulded parts. In a preferred embodiment the inductor is moved along a path relative to the contact surfaces such that the coupling means is activated in a predetermined part of the contact surfaces. It is also possible to hold the inductor stationary and to move the mould with the moulded parts.

For application in the method according to the invention the inductor is connected to an alternating current generator, wherein the alternating current generator is electrically connected to the electrical connecting means of the inductor. Usable frequencies lie generally between 0.1-10 MHz.

In a further preferred embodiment the induction part is provided with at least one feed channel adapted for passage of a cooling medium. The temperature of the induction part can hereby be held constant during use, this also being favorable for the electrical resistance of the inductor. The cooling medium is preferably a liquid such as water, with a high heat capacity. The induction part can for instance be a metal tube bent into the desired form, through which the cooling medium is pumped while an electromagnetic field is caused through the metal of the tube itself with an alternating voltage.

The invention also provides a device for joining moulded parts by electromagnetic welding. The invented device comprises means for moving a joining inductor along a contact surfaces of the moulded parts, means for generating an electromagnetic field in an induction-sensitive component of the moulded part(s) to heat a thermally activated coupling means of the moulded part(s) to above a melting temperature of the coupling means, and means for joining the moulded parts to each other in the contact surfaces by the molten coupling means, further comprising a sensing inductor configured for determining the strength of the electromagnetic field suitable for joining, and comprising means for generating a relatively weak electromagnetic field to slightly heat the thermally activated coupling means to a sensing temperature, means for measuring the field strength generated by the sensing inductor in the moulded part(s), means for determining a discrepancy between the measured field strength of the sensing inductor and the field strength suitable for joining, and means for adjusting the field strength suitable for joining to close the discrepancy. The method according to the invention can be performed in advantageous manner with such a device.

The embodiments of the invention described in this patent application can be combined in any possible combination of these embodiments, and each embodiment can individually form the subject-matter of a divisional patent application.

BRIEF DESCRIPTION OF THE FIGURES

The invention will now be elucidated with reference to the following figures, without however being limited thereto. In the figures.

DESCRIPTION OF EXEMPLARY EMBODIMENTS

Figure 1:
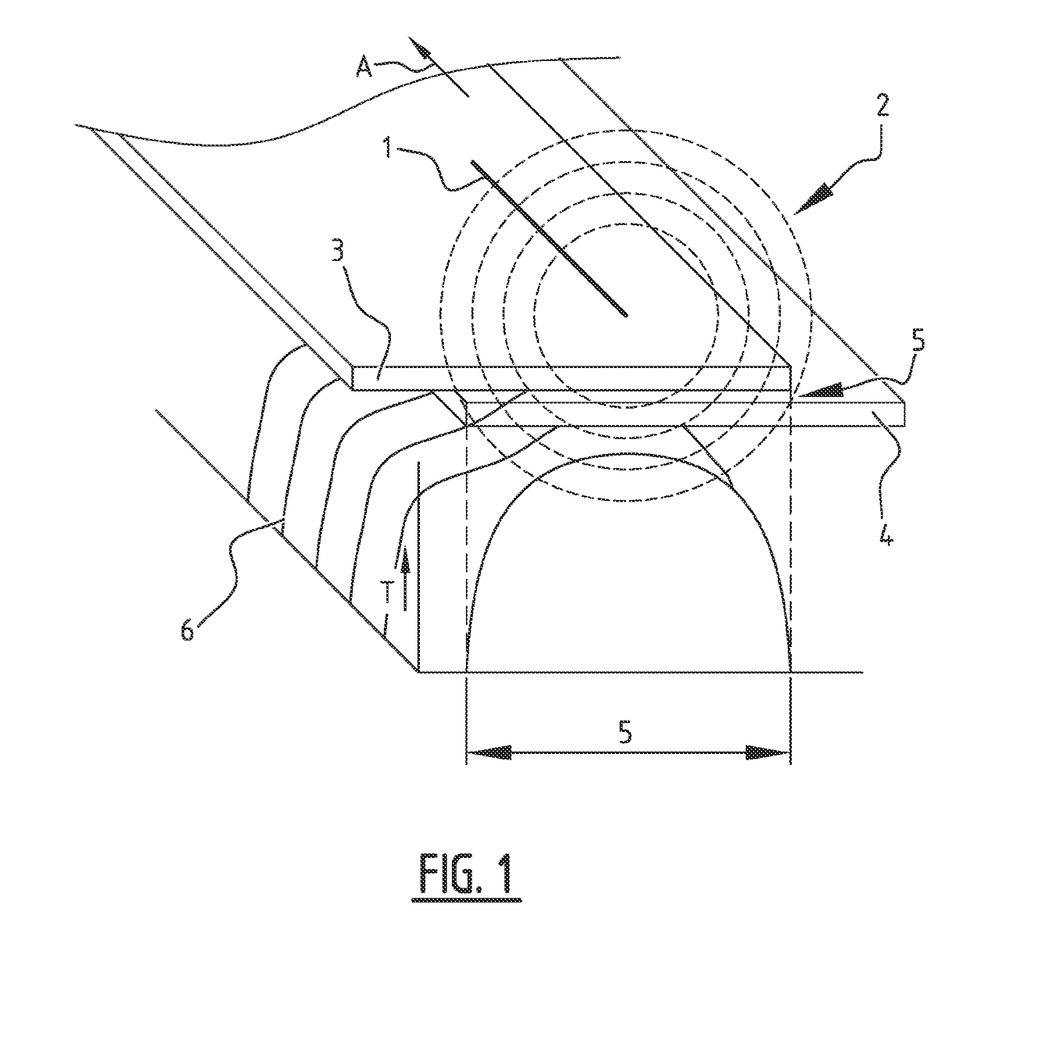
FIG. 1 schematically shows a method for joining two moulded parts by electromagnetic welding according to the state of the art.

FIG. 1 shows an linear inductor 1 which causes a circular electromagnetic field 2 by applying an alternating current of a frequency suitable for electromagnetic welding at a suitable power. A first moulded part 3 and a second moulded part 4 are brought into mutual contact along contact surfaces in this electromagnetic field 2. The moulded parts are manufactured from a thermoplastic resin reinforced with carbon fibres. Heat develops locally in the carbon fibres under the influence of electromagnetic field 2, whereby the thermoplastic resin is heated to above its melting temperature. By pressing with pressing means (not shown) it is possible to couple the thus thermally activated thermoplastic moulded parts 3, 4 at contact surface 5, wherein the coupling at contact surface 5 becomes permanent after cooling of moulded parts 3, 4. The figure further shows the temperature diagram at the contact surface during heating, in which the relative temperature T is plotted against the position on contact surface 5. A third direction 6 defines the direction in which the inductor coil 1 is moved during welding. The temperature diagram shows that the electromagnetic field 2 of constant strength may cause an irregular heating on contact surface 5, wherein a more or less parabolic variation of the temperature is observed in the contact surface 5. The shown variation may also be caused by variation of properties in the moulded parts (3, 4). More importantly, the temperature diagram also shows a variation in the direction 6, which corresponds to the movement direction of the inductor coil 1, i.e. the direction of welding A. Due to this relatively non-uniform heating of the moulded parts (3, 4), the joining of the two parts may also be subject to variation, which may imply a reduced mechanical load-bearing capacity of the bonded or joined assembly of parts 3 and 4. The variation in heating may result in sections of the moulded parts that are thermally degraded by local overheating and/or local incomplete mutual adhesion of the moulded parts (3, 4). This is generally undesirable and the method according to the invention provides a solution to this problem.

Figure 3:
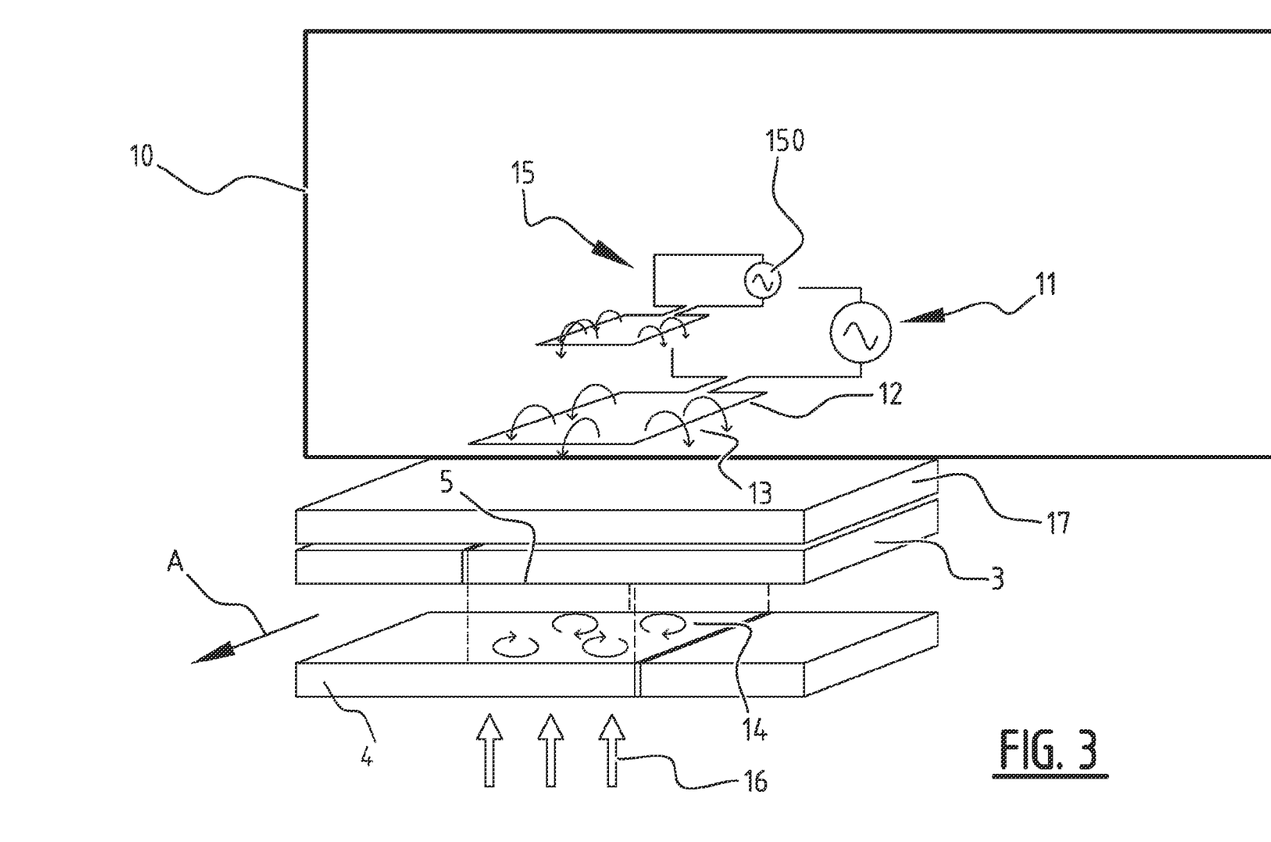
FIG. 3 schematically illustrates a method for joining two moulded parts by electromagnetic welding according to an embodiment of the invention.

Referring to FIG. 3, an embodiment in accordance with the invented method is shown. With the method, moulded parts (3, 4) may be joined by electromagnetic welding. In the embodiment shown in FIG. 3, a sensing inductor 10 is moved along the contact surface between two moulded parts (3, 4) that are pressed against each other by pressure 16. Please note that the figures represent an exploded view. A heat sink 17 may be provided to avoid overheating. The sensing inductor 10 comprises an emitting inductor 11, the inductor coil 12 of which generates a relatively weak electromagnetic field 13. This field 13 causes eddy currents 14 to occur in the moulded parts (3, 4), in particular in their contact surface 5. A receiving inductor 15 of the sensing inductor 10 measures the field strength generated by the emitting inductor 11 in the moulded parts (3, 4) in the form of a non-zero voltage reading 150. For every position along a direction or line of welding A, a discrepancy is determined between the field strength as measured by the receiving inductor 15 of the sensing inductor 10 and the field strength suitable for joining. The field strength suitable for joining is the field strength that induces an optimum temperature profile in the contact surface 5 of the moulded parts (3, 4) to be joined. An optimum temperature profile is a profile with a minimum of variation around a desired constant temperature of welding. The desired constant temperature of welding depends on a number of variables that relate to the properties of the moulded parts materials.

Figure 4:
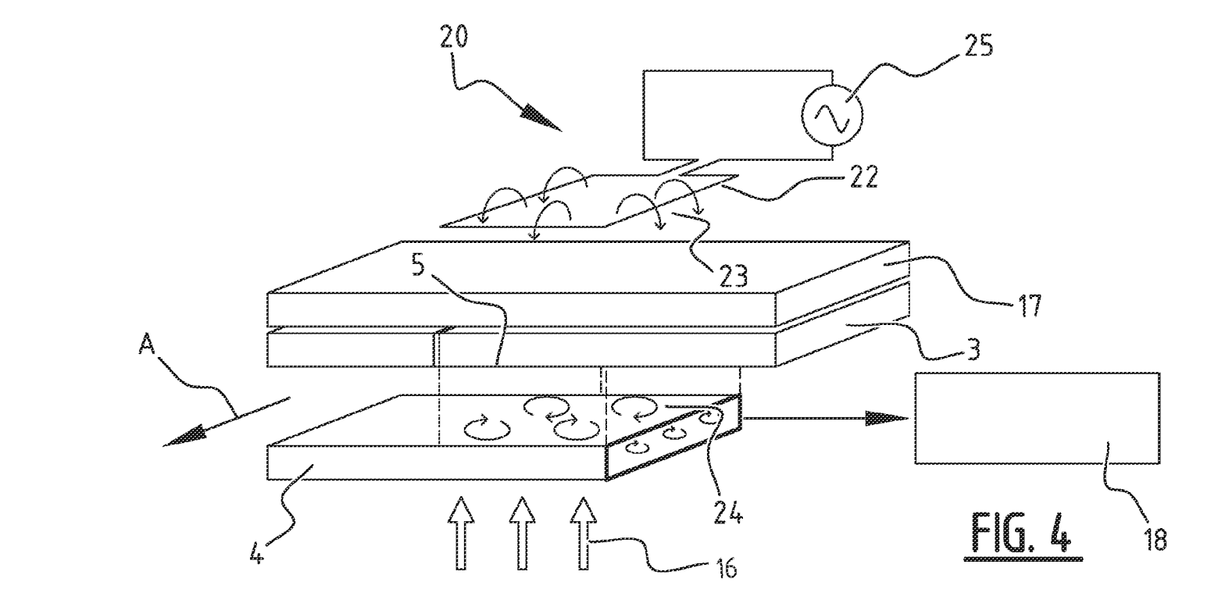
FIG. 4 schematically illustrates a method for joining two moulded parts by electromagnetic welding according to another embodiment of the invention.

FIG. 4 illustrates an embodiment wherein the actual welding for joining is carried out separately, i.e. after the sensing inductor has performed its appropriate action. The shown method comprises moving a joining inductor 20 along the contact surface 5 of the moulded parts (3, 4) and along the same path in the direction of welding A along which the sensing inductor 10 was moved previously. The moulded parts (3, 4) are pressed against each other by pressure 16. The joining inductor 20 has an inductor coil 22 that generates an electromagnetic field 23. This field 23 causes eddy currents 24 to occur in the moulded parts (3, 4), in particular in their contact surface 5. The eddy currents 24 cause a heating of the thermoplastic resin present in the moulded parts (3, 4), at least in and around the contact surface 5. This heating causes a temperature increase within the moulded parts (3, 4), at least in and around the contact surface 5, to a joining temperature which is above the melting temperature of the thermoplastic resin of the moulded part or parts. For every position along a direction or line of welding A, the field strength suitable for joining is adjusted to close the previously determined discrepancy between the field strength as had been measured by the receiving inductor 15 of the sensing inductor 10 and the field strength suitable for joining. This can be done by adapting the power or voltage 25 supplied to the coil 22 of the joining inductor 20. This constant adjustment of the field strength of the electromagnetic waves generated by the joining inductor 20 along the path of welding causes a more constant temperature rise in the moulded parts (3, 4), at least in and around their contact surface 5. This leads to a weld with a better and more consistent quality.

The embodiment of FIG. 3 further comprises measuring the edge effect during welding of the moulded parts (3, 4). Measuring the edge effect may be carried out by a sensor 18 that measures electrical currents at the edges of the moulded part 4. This allows to fine-adjusting the electromagnetic field strength generated by the joining inductor 20 when moving along the line of welding A, in order to further close the discrepancy and avoid variations in field strength and temperature.

Figure 5:
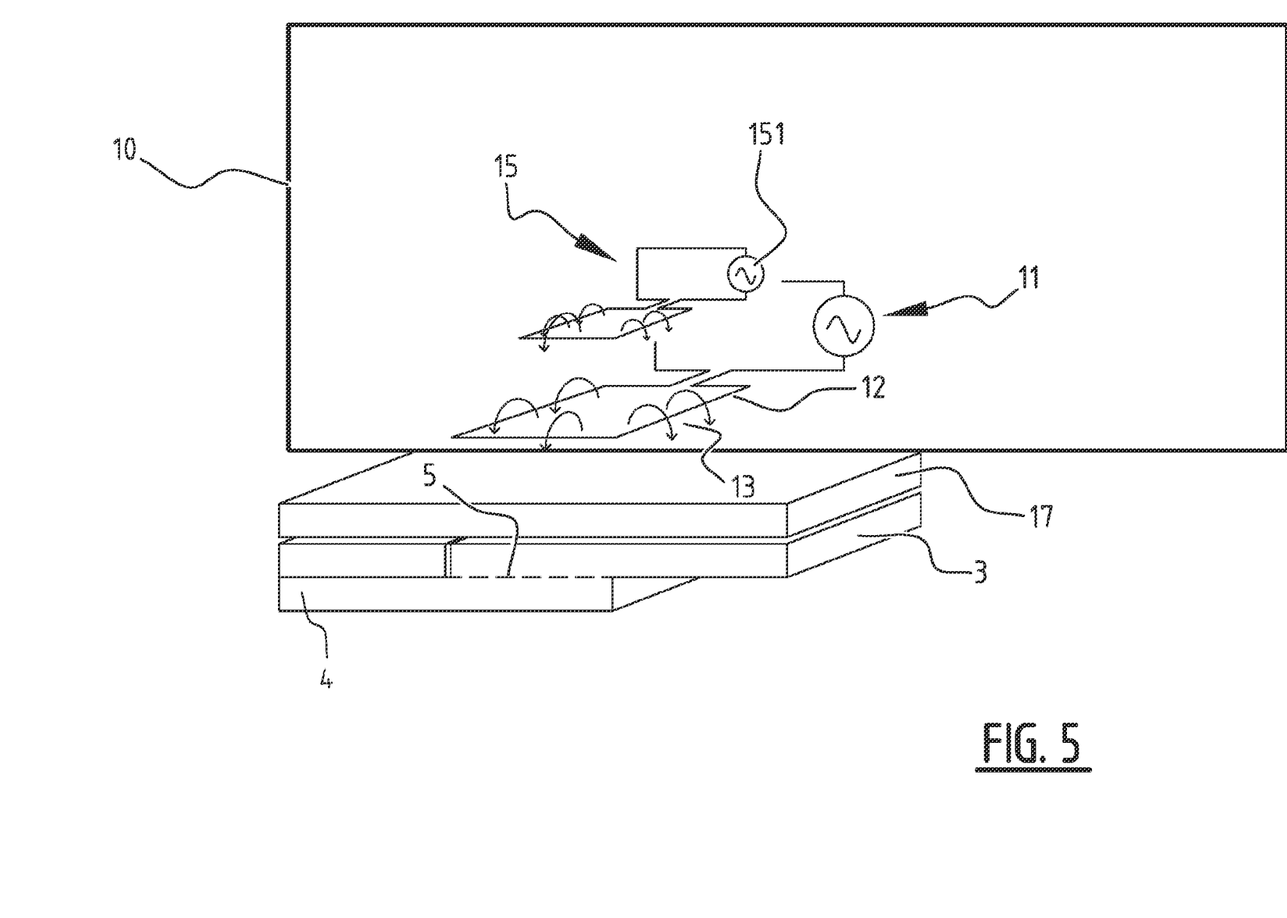
FIGS. 5 and 6 schematically illustrates a method for joining two moulded parts by electromagnetic welding according to yet other embodiments of the invention.

FIG. 5 shows another embodiment of the invented method in which the sensing inductor 10 is again moved over the moulded parts (3, 4) that have been joined by electromagnetic welding, for instance as described above. The sensing inductor 10 is preferably moved along the welding path, i.e. along the line of welding A. The receiving inductor 15 of the sensing inductor 10 again measures the field strength generated by the emitting inductor 11 in the assembly of joined moulded parts (3, 4) in the form of a non-zero voltage reading 151. This reading 151 is likely to be different from the reading 150 obtained for the non-joined moulded parts (3, 4). The series of readings 151 may be used as a means for additional quality control.

Figure 6:
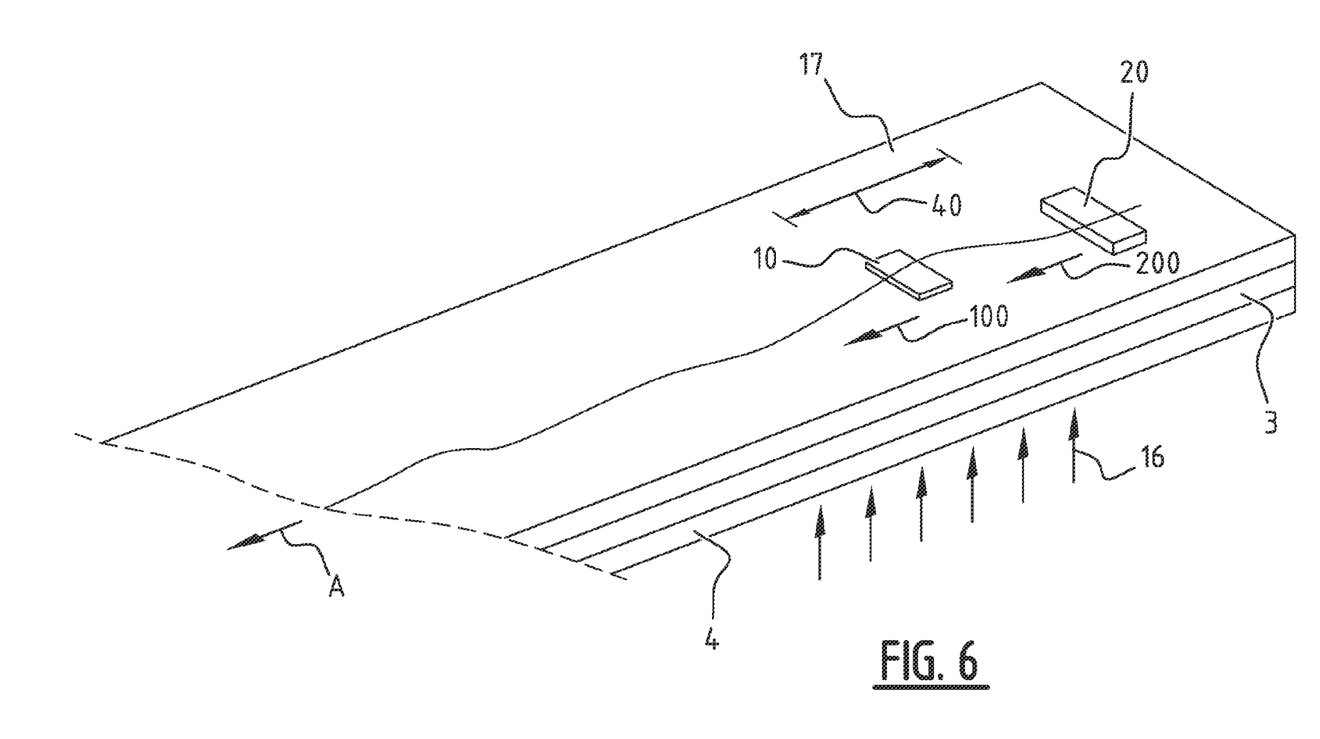

As shown in FIG. 6, another embodiment involves moving the sensing inductor 10 simultaneously with, but slightly ahead of, the joining inductor 20 along the line of welding A. Both inductors (10, 20) are moved according to arrows (100, 200) along the line of welding A but at a distance 40 from each other. Please note that the line of welding A is not confined to a straight line and the line of welding may comprise any path, even tortuous or interrupted paths.

Figure 2:
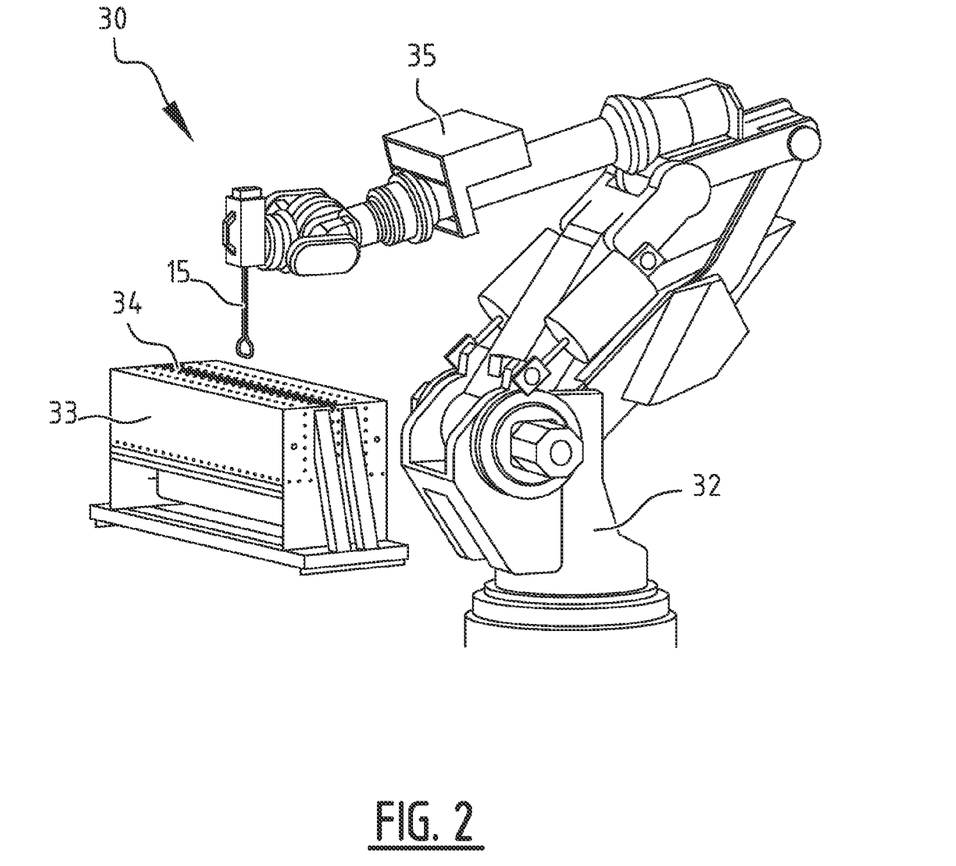
FIG. 2 schematically shows a welding device in accordance with one embodiment of the invention.

FIG. 2 finally shows a welding device 30 provided with a joining inductor 15. The inductor 15 may be guided along a line of welding which may be a pre-programmed path by means of an industrial six-axis robot 32 in order to achieve a desired weld. In this case moulded parts for welding (as shown in FIGS. 3-6) may be fixed and pressed together in a mould 33, manufactured for this purpose. Mould 33 may be provided with a recess 34 through which the inductor 15 may be moved close to the moulded parts for welding. The inductor 15 may be connected to an alternating current generator 35 arranged on robot 32 for the purpose of generating the electromagnetic field. The strength of the electromagnetic field is varied along the line of welding to at least partly compensate for any temperature variations that may occur in the contact plane of the moulded parts along the line of welding, and that were determined by the sensing inductor in accordance with any of the embodiments disclosed in the present application.

The invention claimed is:

1. A method for joining moulded parts by electromagnetic welding, comprising:
    moving a joining inductor along a welding path of contact surfaces of the moulded parts,
    generating an electromagnetic field in an induction-sensitive component of the moulded part(s) to heat a thermally activated coupling material of the moulded part(s) to above a melting temperature of the coupling material, and
    joining the moulded parts to each other in the contact surfaces by the molten coupling material,
    wherein the strength of the electromagnetic field suitable for joining is determined by previously moving a sensing inductor along the welding path in a contact plane, the sensing inductor comprising an emitting inductor that generates a relatively weak electromagnetic field, and a receiving inductor that measures the field strength generated by the emitting inductor in the moulded part(s),
    determining a discrepancy between the measured field strength of the receiving inductor and the field strength suitable for joining for each position along the welding path, and
    adjusting the field strength suitable for joining to close the discrepancy by adapting a power or a voltage supplied to the joining inductor for each of said positions along the welding path.

2. The method according to claim 1, wherein the discrepancy is determined at several positions of movement along the contact surfaces.

3. The method according to claim 2, wherein adjusting the field strength suitable for joining to close the discrepancy is carried out continuously along the contact surfaces.

4. The method according to claim 1, wherein the sensing inductor is moved along the contact surfaces ahead of the joining inductor.

5. The method according to claim 4, wherein the sensing inductor and the joining inductor are one and the same.

6. The method according to claim 4, wherein the sensing inductor and the joining inductor are separate and are simultaneously moved along the contact surfaces.

7. The method according to claim 1, wherein the sensing inductor comprises an emitting inductor generating the electromagnetic field and a receiving inductor measuring the field strength generated by the sensing inductor in the moulded part(s).

8. The method according to claim 7, wherein the influence of the emitting inductor on the receiving inductor measured field strength generated by the sensing inductor in the moulded part(s) is accounted for.

9. The method according to claim 1, wherein measuring the field strength generated by the sensing inductor in the moulded part(s) is carried out by measuring the electrical currents caused by a short circuit at edges of the moulded part(s).

10. The method according to claim 1, wherein the inductor comprises a linear induction segment which generates a substantially cylindrical electromagnetic field.

11. The method according to claim 1, wherein the thermally activated coupling means comprises a thermoplastic plastic.

12. The method according to claim 1, wherein the induction-sensitive component is selected from carbon fibres, a metal or ferromagnetic particles, or combinations of these.

13. A device for joining moulded parts by electromagnetic welding, comprising:
- means for moving a joining inductor along a welding path of contact surfaces of the moulded parts,
- means for generating an electromagnetic field in an induction-sensitive component of the moulded part(s) to heat a thermally activated coupling material of the moulded part(s) to above a melting temperature of the coupling material, and
- means for joining the moulded parts to each other in the contact surfaces by the molten coupling material,
- a sensing inductor configured for determining the strength of the electromagnetic field suitable for joining along the welding path, the sensing inductor further including an emitting inductor for generating a relatively weak electromagnetic field to slightly heat the thermally activated coupling material to a sensing temperature, and a receiving inductor for measuring the field strength generated by the emitting inductor in the moulded part(s),
- the sensing inductor configured for determining a discrepancy between the measured field strength of the receiving inductor and the field strength suitable for joining for each position along the welding path, and
- the sensing inductor further configured for adjusting the field strength suitable for joining to close the discrepancy by adapting a power or a voltage supplied to the joining inductor for each of said positions along the welding path.

* * * * *